US010696172B2

(12) United States Patent
Heyne et al.

(10) Patent No.: US 10,696,172 B2
(45) Date of Patent: Jun. 30, 2020

(54) CHARGING STATION FOR ELECTRIC AUTOMOBILES HAVING A REMOVABLE AND/OR FOLDING HOOD

(71) Applicants: Dr. Ing. h.c. F. Porsche Aktiengesellschaft, Stuttgart (DE); ads-tec GmbH, Nürtingen (DE)

(72) Inventors: Raoul Heyne, Wiernsheim (DE); Florian Joslowski, Leinfelden-Echterdingen (DE); Michael Kiefer, Stuttgart (DE); Thomas Speidel, Markgröningen (DE); Matthias Bohner, Stuttgart (DE)

(73) Assignees: Dr. Ing. h.c. F. Porsche Aktiengesellschaft (DE); ads-tec GmbH (DE)

( * ) Notice: Subject to any disclaimer, the term of this patent is extended or adjusted under 35 U.S.C. 154(b) by 0 days.

(21) Appl. No.: 16/152,668

(22) Filed: Oct. 5, 2018

(65) Prior Publication Data

US 2019/0106009 A1 Apr. 11, 2019

(30) Foreign Application Priority Data

Oct. 6, 2017 (DE) ........................ 10 2017 217 755

(51) Int. Cl.
*B60L 11/18* (2006.01)
*B60L 53/31* (2019.01)
*B60L 53/302* (2019.01)

(52) U.S. Cl.
CPC ......... *B60L 11/1825* (2013.01); *B60L 53/302* (2019.02); *B60L 53/31* (2019.02); *B60L 2230/10* (2013.01)

(58) Field of Classification Search
CPC .............. B60L 11/1825; B60L 2230/10; B60L 53/302; B60L 53/31; B60L 11/1824
See application file for complete search history.

(56) References Cited

U.S. PATENT DOCUMENTS

| | | | | |
|---|---|---|---|---|
| 5,187,423 A * | 2/1993 | Marton | B60K 1/04 | 320/109 |
| 5,215,208 A * | 6/1993 | Jackson | A45C 11/20 | 206/427 |
| 2010/0225475 A1 | 9/2010 | Karch et al. | | |
| 2011/0140657 A1 | 6/2011 | Genzel et al. | | |

FOREIGN PATENT DOCUMENTS

| | | |
|---|---|---|
| CN | 205674884 U | 11/2016 |
| DE | 102011056651 A1 | 6/2013 |
| EP | 2875989 A1 | 5/2015 |

* cited by examiner

*Primary Examiner* — Vuthe Siek
(74) *Attorney, Agent, or Firm* — RatnerPrestia

(57) ABSTRACT

A charging station for electric automobiles having a removable and/or folding hood and a circumferential sealing strip. The hood has a marginal sealing surface and the charging station is configured in such a way that the sealing strip and the sealing surface together form a continuous seal when the hood rests on the charging station.

17 Claims, 1 Drawing Sheet

10
17
16
18
13
11
15
12
14
14

CHARGING STATION FOR ELECTRIC AUTOMOBILES HAVING A REMOVABLE AND/OR FOLDING HOOD

CROSS-REFERENCE TO RELATED APPLICATION

This application claims priority to German Patent Application No. DE 10 2017 217 755.1, filed Oct. 6, 2017, the contents of such application being incorporated by reference herein in their entirety.

FIELD OF THE INVENTION

The present invention relates to a changing station for electric automobiles.

BACKGROUND OF THE INVENTION

In electrical engineering, any stationary device or electrical system that serves for supplying energy to mobile, battery-operated units, machines or motor vehicles by way of simple setting or insertion without it being necessary for the energy store—for example the traction battery of an electric automobile—to be removed compulsorily is referred to as a charging station. Charging stations for electric automobiles are also sometimes referred to as "electricity charging stations" and can comprise a plurality of charging points.

Known here in particular are direct-current fast charging/high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the electricity network or by way of large buffer accumulators at solar charging stations, for example. Situated in the vehicle is a battery management system, which communicates with the charging column directly or indirectly in order to adapt the current intensity, or to terminate the process when a capacity limit is reached.

The power electronics system is usually located in this case in the charging column. Since the direct-current connections of the charging column are connected directly to corresponding connections of the traction battery, it is possible for high charging currents to be transmitted with little loss, this allowing short charging times but also generating a considerable amount of waste heat.

Known charging columns for electric vehicles take up a large installation space when a battery is integrated therein. Large cabinets or charging columns that have heights of from 1.8 in to 2.2 m are commonly used. Such columns usually have one or two doors to ensure maintenance and accessibility. Said doors are often the weak points for penetrating water etc. Vandalism can also be carried out more easily by means of the doors since as a result weak points can be identified by vandals.

CN205674884U, which is incorporated by reference herein, discloses a charging station or column having a cube-shaped housing.

DE102011056651A1, EP2875989A1 and US2011140657A1, all of which are incorporated by reference herein, relate to charging stations or columns having a housing for protection against environmental influences or measures against vandalism.

US2010225475A1, which is incorporated by reference herein, describes a charging station or column having a multilateral hinged cover.

SUMMARY OF THE INVENTION

Described herein is a charging station for electric automobiles.

The charging station has a compact design that does not hinder or only insignificantly hinders the visibility in road traffic. A charging station according to aspects of the invention is also easy to open and nevertheless resistant to environmental influences. In particular, said charging station is easily accessible in order to be able to perform maintenance and installation in a simple manner. Finally, for vandals, the charging station can be opened only with a high level of effort.

Further advantageous configurations of the invention are specified in the dependent patent claims. Said charging station can therefore be implemented in the form of a cube having dimensions of approximately 1.2 m by 1.2 m and 1.3 m in height, which cube is visible above ground independently of the base. In this case, the cube is provided with a hood—similarly to a piece of furniture covered with a cover.

Preferably, four sides and an upper part of a side on which hinges are fitted constitute said hood, which can be folded out. The weight of said hood is selected so that even one single person can manage it. When detaching the hinges, the hood can also be removed completely. In this way, gaps into which water can enter are substantially eliminated. Furthermore, the opening mechanism can be comprehended by vandals only with difficulty.

BRIEF DESCRIPTION OF THE DRAWINGS

One exemplary embodiment of the invention is illustrated in the drawings and will be described in more detail below. In the drawings.

DETAILED DESCRIPTION OF THE INVENTION

Figure 1:
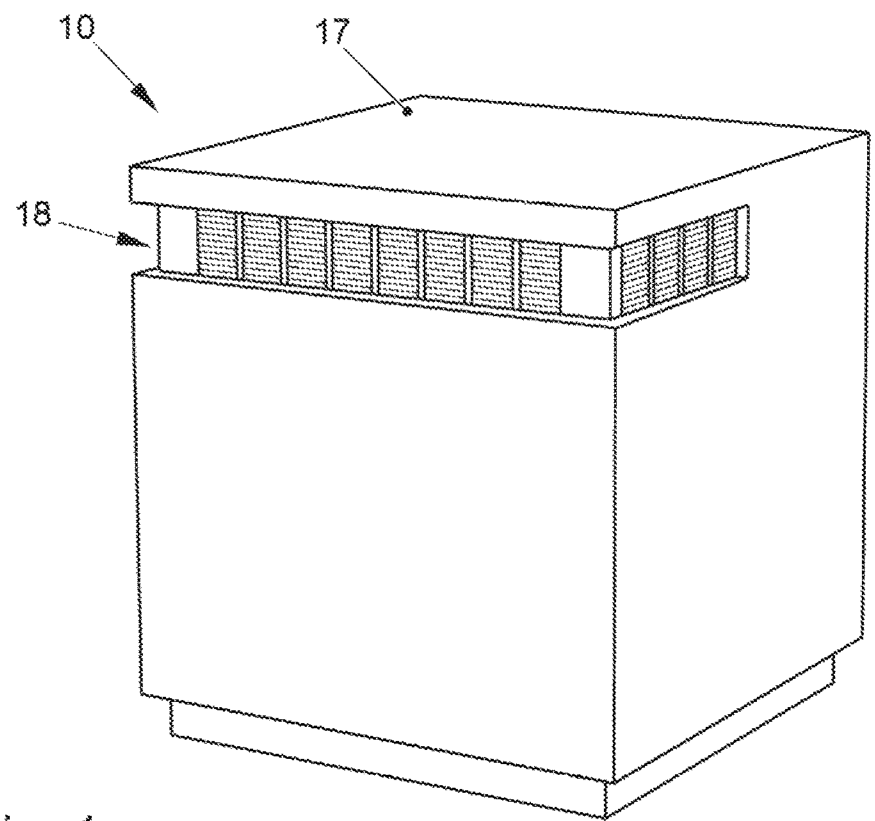
FIG. 1 shows the perspective view of a charging station according to aspects of the invention.

FIG. 1 illustrates the basic design of a charging station (10) having a rectangular layout of a side length of 1.2 m at a height of 1.3 m. A large part of the charging station (10) is recognizably covered by a removable hood (17), which is interrupted only in the region of a provided recooling system (18) of the charging station (10) by grates that are offset toward the inside. The charging station (10) includes a stationary body, and the stationary body is covered by the removable hood (17).

Figure 2:
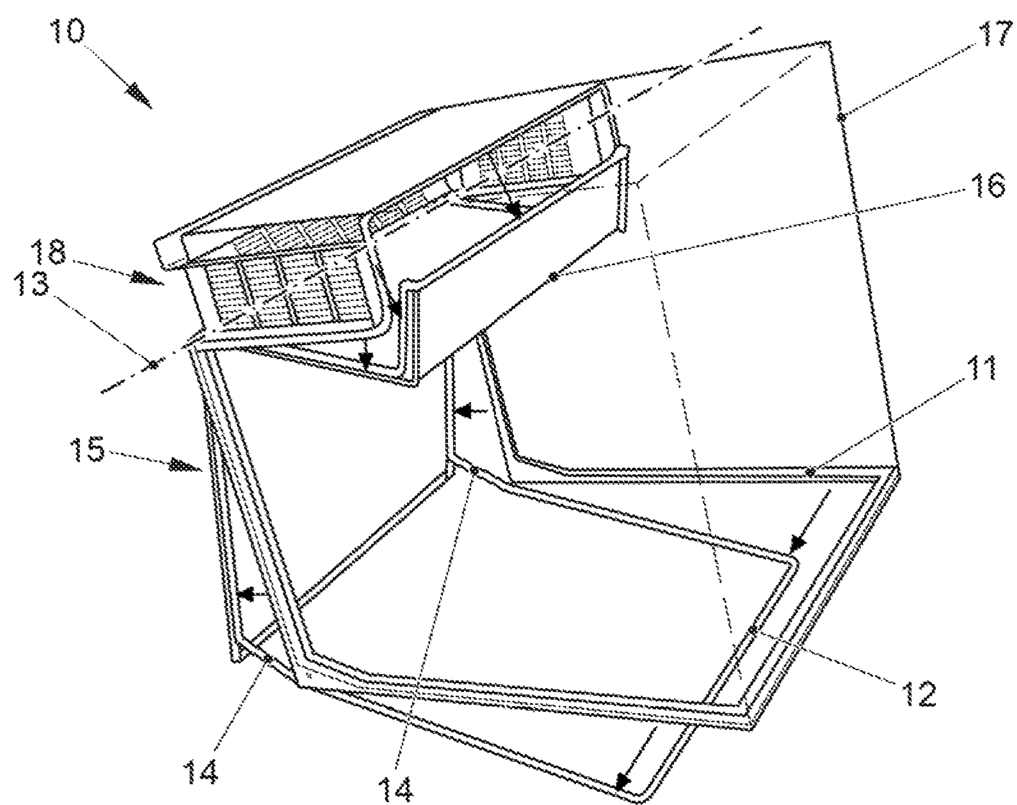
FIG. 2 shows the folded-out charging station a semitransparent view.

FIG. 2 illustrates the functional mechanism of the hood (17), the marginal sealing surface (11) of which interacts with a sealing strip (12) surrounding the charging station (10). The sealing strip (12) is connected to the stationary body and remains stationary with the stationary body. The seal (11, 12) formed by the two components when the hood (17) is resting completely is separated in the state according to the drawing since the hood (17) has been pivoted toward the rear about its horizontally running axis of rotation (13) by means of hinges (not illustrated in the drawing). As can be seen from FIG. 2, by suitably arranging the hinges, the axis of rotation (13) is selected for this purpose in such a way that the seal (11, 12) is pressed together substantially perpendicularly when the hood (17) is closed without the sealing surface (11) and the sealing strip (12) being shifted considerably with respect to one another during pressing. Below the axis of rotation (13), the sealing strip (12) and the sealing surface (11) can, in sections, also indicate chamfers (14) in such a way that the seal (11, 12) is pressed together when the hood (17) is closed. For the same purpose, the sealing surface (11) is inclined toward the inside in the upper region of the hood (17).

The stationary rear wall (15) of the charging station (10) in this case has a step (16), which is offset toward the inside and thus covered by the cooling vents in FIG. 1 and which supports the recooling system (18) that is provided with suitable hose connections. In a manner that is simple in terms of maintenance, the recooling system (18) consequently also remains in position when the hood (17) is folded out, as shown in the drawing, in order, for example, to blow out the step (16) or to clean it in some other way. In this way, it is possible for a single person to perform maintenance on the well-protected system without problem. However, for more complex repair work, for example on the power electronics system or buffer stores of the charging station (10), the hood (17) can also be completely detached from the base body out of the shown position when required.

What is claimed is:

1. A charging station for charging a battery of an electric automobile, said charging station comprising:

a stationary body;

a circumferential sealing strip attached to the stationary body, a removable or folding hood that is either moveably or removably connected to the stationary body, the hood having a marginal sealing surface, and wherein the sealing strip and the sealing surface together form a continuous seal when the hood rests on the sealing strip of the charging station.

2. The charging station as claimed in claim 1, wherein the charging station has hinges about which the hood is configured to pivot about an axis of rotation, and the axis of rotation is selected so that the sealing strip and the sealing surface are pressed together perpendicularly when the hood is closed.

3. The charging station as claimed in claim 2, wherein the sealing surface and the sealing strip each include chamfers below the axis of rotation that are configured such that the sealing strip and the sealing surface are pressed together when the hood is closed.

4. The charging station as claimed in claim 2, wherein the axis of rotation is defined at an elevation beneath a top surface of the charging station.

5. The charging station as claimed in claim 4, wherein the axis of rotation is defined at an elevation between a top surface and a bottom surface of the charging station.

6. The charging station as claimed in claim 4, wherein the stationary body of the charging station comprises a stationary rear wall, and the stationary rear wall comprises a step that is offset toward an interior of the charging station, and wherein the axis of rotation is aligned with a base surface of the step.

7. The charging station as claimed in claim 1, wherein at least a portion of the sealing surface is inclined toward an interior region of the charging station such that the sealing strip and the sealing surface are pressed together when the hood is closed.

8. The charging station as claimed in claim 1, wherein the stationary body of the charging station comprises a stationary rear wall.

9. The charging station as claimed in claim 8, wherein the stationary rear wall comprises a step that is offset toward an interior of the charging station.

10. The charging station as claimed in claim 9, wherein the charging station comprises a recooling system, and the recooling system is secured on the step.

11. The charging station as claimed in claim 10, wherein the hood is shaped in such a way and the hinges are arranged in such a way that the step is accessible through pivoting of the hood.

12. The charging station as claimed in claim 9, wherein the step extends only partially across a depth dimension of the stationary body.

13. The charging station as claimed in claim 10, further comprising vent openings disposed in the hood that correspond in position with the recooling system.

14. The charging station as claimed in claim 1, wherein the charging station has a rectangular layout.

15. The charging station as claimed in claim 14, wherein the charging station has a width and depth of in each case 1.2 meters at a height of 1.3 meters.

16. The charging station as claimed in claim 1, wherein the charging station is separate from the electric automobile.

17. The charging station as claimed in claim 1, wherein the charging station is configured to be releasably connected to the battery of the electric automobile by a cable.

* * * * *